(12) United States Patent
Shin et al.

(10) Patent No.: US 7,271,903 B2
(45) Date of Patent: Sep. 18, 2007

(54) APPARATUS AND METHOD FOR TESTING LIQUID CRYSTAL DISPLAY PANEL

(75) Inventors: Sang-Sun Shin, Kyongsangbuk-do (KR); Ho-Kyun Kim, Inchon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 824 days.

(21) Appl. No.: 10/322,422

(22) Filed: Dec. 19, 2002

(65) Prior Publication Data

US 2003/0174214 A1    Sep. 18, 2003

(30) Foreign Application Priority Data

Mar. 15, 2002    (KR)    ................ P10-2002-0014194

(51) Int. Cl.
*G01B 11/00*    (2006.01)

(52) U.S. Cl. .................................... 356/394

(58) Field of Classification Search ............. None
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,734,158 A * | 3/1998 | Nagashima et al. ........ 250/225 |
| 5,742,370 A | 4/1998 | Kim et al. |
| 5,757,193 A * | 5/1998 | Yu et al. .................... 324/501 |
| 5,757,451 A | 5/1998 | Miyazaki et al. |
| 5,793,221 A * | 8/1998 | Aoki .......................... 324/770 |
| 5,852,484 A | 12/1998 | Inoue et al. |
| 5,854,664 A | 12/1998 | Inoue et al. |

(Continued)

FOREIGN PATENT DOCUMENTS

EP    1 003 066    5/2000

(Continued)

*Primary Examiner*—Michael P. Stafira
(74) *Attorney, Agent, or Firm*—McKenna Long & Aldridge LLP (57) ABSTRACT

A device and a method for testing a liquid crystal display panel are disclosed in the present invention, which enable to conveniently inspect a cutting plane of an individual unit liquid crystal panel. The apparatus includes a first memory unit storing a reference image of an end portion of a reference panel taken through a camera, a second memory unit storing an observed image of an end portion of a cut unit liquid crystal display panel taken through the camera, a comparison/computation unit computing a difference value by comparing the reference image and the observed image, and a display unit displaying the difference value of the comparison/computation unit.

17 Claims, 3 Drawing Sheets

U.S. PATENT DOCUMENTS

| | | | |
|---|---|---|---|
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,297,869 B1 | 10/2001 | Choo et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,983,067 B2 * | 1/2003 | Cox .......................... 382/145 |
| 2001/0021000 A1 | 9/2001 | Egami |

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-38414 | 3/1982 |
| JP | 57-088428 | 6/1982 |
| JP | 57-88428 | 6/1982 |
| JP | 58-27126 | 2/1983 |
| JP | 58-027126 | 2/1983 |
| JP | 59-57221 | 4/1984 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-7822 | 1/1986 |
| JP | 61-055625 | 3/1986 |
| JP | 61-55625 | 3/1986 |
| JP | S62-054225 | 3/1987 |
| JP | S62-054228 | 3/1987 |
| JP | 62-89025 | 4/1987 |
| JP | 62-089025 | 4/1987 |
| JP | 62-90622 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-127179 | 5/1993 |
| JP | 5-154923 | 6/1993 |
| JP | 05-154923 | 6/1993 |
| JP | 05-265011 | 10/1993 |
| JP | 5-265011 | 10/1993 |
| JP | 5-281557 | 10/1993 |
| JP | 05-281557 | 10/1993 |
| JP | 05-281562 | 10/1993 |
| JP | 5-281562 | 10/1993 |
| JP | H06-018829 | 1/1994 |
| JP | 6-51256 | 2/1994 |
| JP | 06-051256 | 2/1994 |
| JP | H06-064229 | 3/1994 |
| JP | 6-148657 | 5/1994 |
| JP | 06-148657 | 5/1994 |
| JP | 6-160871 | 6/1994 |
| JP | 06-160871 | 6/1994 |
| JP | 6-235925 | 8/1994 |
| JP | 06-235925 | 8/1994 |
| JP | 6-265915 | 9/1994 |
| JP | 06-265915 | 9/1994 |
| JP | 6-313870 | 11/1994 |
| JP | 06-313870 | 11/1994 |
| JP | 7-84268 | 3/1995 |
| JP | 07-084268 | 3/1995 |
| JP | 7-128674 | 5/1995 |
| JP | 07-128674 | 5/1995 |
| JP | 7-181507 | 7/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 8-95066 | 4/1996 |
| JP | 08-101395 | 4/1996 |
| JP | 8-101395 | 4/1996 |
| JP | 08-106101 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 08-171094 | 7/1996 |
| JP | 08-190099 | 7/1996 |
| JP | 8-190099 | 7/1996 |
| JP | 8194734 | 7/1996 |
| JP | H08-173874 | 7/1996 |
| JP | 08-240807 | 9/1996 |
| JP | 8-240807 | 9/1996 |
| JP | 9-5762 | 1/1997 |
| JP | 09-005762 | 1/1997 |
| JP | 9-26578 | 1/1997 |
| JP | 09-026578 | 1/1997 |
| JP | H09-001026 | 1/1997 |
| JP | 09-311340 | 2/1997 |
| JP | 9-61829 | 3/1997 |
| JP | 09-61829 | 3/1997 |
| JP | 9-73075 | 3/1997 |
| JP | 09-073075 | 3/1997 |
| JP | 09-073096 | 3/1997 |
| JP | 9-73096 | 3/1997 |
| JP | H09-094500 | 4/1997 |
| JP | 09-127528 | 5/1997 |
| JP | 9-127528 | 5/1997 |
| JP | H06-194637 | 7/1997 |
| JP | 9-230357 | 9/1997 |
| JP | 09-230357 | 9/1997 |
| JP | 09-281511 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10170241 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-14953 | 1/1999 |
| JP | 11-038424 | 2/1999 |
| JP | 11-38424 | 2/1999 |
| JP | 11-64811 | 3/1999 |
| JP | 11-064811 | 3/1999 |
| JP | 11-109388 | 4/1999 |
| JP | 11-133438 | 5/1999 |

| | | | | | | |
|---|---|---|---|---|---|---|
| JP | 11-142864 | 5/1999 | | JP | 2001-264782 | 9/2001 |
| JP | 11-174477 | 7/1999 | | JP | 2001241921 | 9/2001 |
| JP | 11-212045 | 8/1999 | | JP | 2001-272640 | 10/2001 |
| JP | 11-248930 | 9/1999 | | JP | 2001-281675 | 10/2001 |
| JP | H11-262712 | 9/1999 | | JP | 2001-281678 | 10/2001 |
| JP | H11-264991 | 9/1999 | | JP | 2001-282126 | 10/2001 |
| JP | 11-326922 | 11/1999 | | JP | 2001-305563 | 10/2001 |
| JP | 11-344714 | 12/1999 | | JP | 2001-330837 | 11/2001 |
| JP | 2000-2879 | 1/2000 | | JP | 2001-330840 | 11/2001 |
| JP | 2000-002879 | 1/2000 | | JP | 2001-356353 | 12/2001 |
| JP | 2000-029035 | 1/2000 | | JP | 2001-356354 | 12/2001 |
| JP | 2000-29035 | 1/2000 | | JP | 2002-014360 | 1/2002 |
| JP | 2000-56311 | 2/2000 | | JP | 2002-14360 | 1/2002 |
| JP | 2000-056311 | 2/2000 | | JP | 2002-23176 | 1/2002 |
| JP | 2000039599 | 2/2000 | | JP | 2002-023176 | 1/2002 |
| JP | 2000-66165 | 3/2000 | | JP | 2002-049045 | 2/2002 |
| JP | 2000-066165 | 3/2000 | | JP | 2002-49045 | 2/2002 |
| JP | 2000-066218 | 3/2000 | | JP | 2002-079160 | 3/2002 |
| JP | 2000-093866 | 4/2000 | | JP | 2002-080321 | 3/2002 |
| JP | 2000-137235 | 5/2000 | | JP | 2002-082340 | 3/2002 |
| JP | 2000-147528 | 5/2000 | | JP | 2002-82340 | 3/2002 |
| JP | 2000-167681 | 6/2000 | | JP | 2002-090759 | 3/2002 |
| JP | 2000-193988 | 7/2000 | | JP | 2002-90759 | 3/2002 |
| JP | 2000-241824 | 9/2000 | | JP | 2002-090760 | 3/2002 |
| JP | 2000-284295 | 10/2000 | | JP | 2002-90760 | 3/2002 |
| JP | 2000-292799 | 10/2000 | | JP | 2002-107740 | 4/2002 |
| JP | 2000-310759 | 11/2000 | | JP | 2002-122870 | 4/2002 |
| JP | 2000-310784 | 11/2000 | | JP | 2002-122872 | 4/2002 |
| JP | 2000-338501 | 12/2000 | | JP | 2002-122873 | 4/2002 |
| JP | 2001-005401 | 1/2001 | | JP | 2002-131762 | 5/2002 |
| JP | 2001-5401 | 1/2001 | | JP | 2002-139734 | 5/2002 |
| JP | 2001-005405 | 1/2001 | | JP | 2002-156518 | 5/2002 |
| JP | 2001-5405 | 1/2001 | | JP | 2002-169166 | 6/2002 |
| JP | 2001-013506 | 1/2001 | | JP | 2002-169167 | 6/2002 |
| JP | 2001-13506 | 1/2001 | | JP | 2002-182222 | 6/2002 |
| JP | 2001-33793 | 2/2001 | | JP | 2002-202512 | 7/2002 |
| JP | 2001-033793 | 2/2001 | | JP | 2002-202514 | 7/2002 |
| JP | 2001-042341 | 2/2001 | | JP | 2002-214626 | 7/2002 |
| JP | 2001-42341 | 2/2001 | | JP | 2002-229042 | 8/2002 |
| JP | 2001-51284 | 2/2001 | | JP | 2002-236276 | 8/2002 |
| JP | 2001-051284 | 2/2001 | | JP | 2002-258299 | 8/2002 |
| JP | 2001-66615 | 3/2001 | | JP | 2002-236292 | 9/2002 |
| JP | 2001-066615 | 3/2001 | | JP | 2002-277865 | 9/2002 |
| JP | 2001-091727 | 4/2001 | | JP | 2002-277866 | 9/2002 |
| JP | 2001-91727 | 4/2001 | | JP | 2002-277881 | 9/2002 |
| JP | 2001-117105 | 4/2001 | | JP | 2002-287156 | 10/2002 |
| JP | 2001-117109 | 4/2001 | | JP | 2002-296605 | 10/2002 |
| JP | 2001-133745 | 5/2001 | | JP | 2002-311438 | 10/2002 |
| JP | 2001-133794 | 5/2001 | | JP | 2002-311440 | 10/2002 |
| JP | 2001-133799 | 5/2001 | | JP | 2002-311442 | 10/2002 |
| JP | 2001-142074 | 5/2001 | | JP | 2002-323687 | 11/2002 |
| JP | 2001-147437 | 5/2001 | | JP | 2002-323694 | 11/2002 |
| JP | 2001-154211 | 6/2001 | | JP | 2002-333628 | 11/2002 |
| JP | 2001-166272 | 6/2001 | | JP | 2002-333635 | 11/2002 |
| JP | 2001-166310 | 6/2001 | | JP | 2002-333843 | 11/2002 |
| JP | 2001-183683 | 7/2001 | | JP | 2002-341329 | 11/2002 |
| JP | 2001-201750 | 7/2001 | | JP | 2002-341355 | 11/2002 |
| JP | 2001-209052 | 8/2001 | | JP | 2002-341356 | 11/2002 |
| JP | 2001-209056 | 8/2001 | | JP | 2002-341357 | 11/2002 |
| JP | 2001-209057 | 8/2001 | | JP | 2002-341358 | 11/2002 |
| JP | 2001-209058 | 8/2001 | | JP | 2002-341359 | 11/2002 |
| JP | 2001-209060 | 8/2001 | | JP | 2002-341362 | 11/2002 |
| JP | 2001-215459 | 8/2001 | | KR | 2000-0035302 | 6/2000 |
| JP | 2001-222017 | 8/2001 | | | | |
| JP | 2001-235758 | 8/2001 | | | | |
| JP | 2001-255542 | 9/2001 | | | | |

\* cited by examiner

APPARATUS AND METHOD FOR TESTING LIQUID CRYSTAL DISPLAY PANEL

This application claims the benefit of the Korean Patent Application No. P2002-014194 filed on Mar. 15, 2002, which is hereby incorporated by reference.

BACKGROUND OF THE INVENTION

1. Field of the Invention

The present invention relates to a testing apparatus, and more particularly, to an apparatus and a method for testing a liquid crystal display panel. Although the present invention is suitable for a wide scope of applications, it is particularly suitable for providing high reliability in testing a unit liquid crystal display panel.

2. Discussion of the Related Art

A liquid crystal display device provides liquid crystal cells arranged in a matrix form with corresponding data signals according to image information respectively to display a demanded image by controlling a light-transmittance of each liquid crystal cells. In order to improve yield, a method of fabricating the liquid crystal display device includes the steps of forming thin film transistor array substrates on a wide mother substrate, forming color filter substrates on the other mother substrate, bonding both of the mother substrates to each other to form a plurality of liquid crystal display panels at the same time. Hence, the method demands a process of cutting the bonded mother substrates into unit liquid crystal display panels.

Such a cutting process of the unit panels generally includes forming a scribing line on a mother substrate using a pen having hardness greater than that of glass, and a process of propagating a crack along the scribing line. Such a cutting process of the unit panels is explained in detail by referring to the attached drawings as follows.

Figure 1:
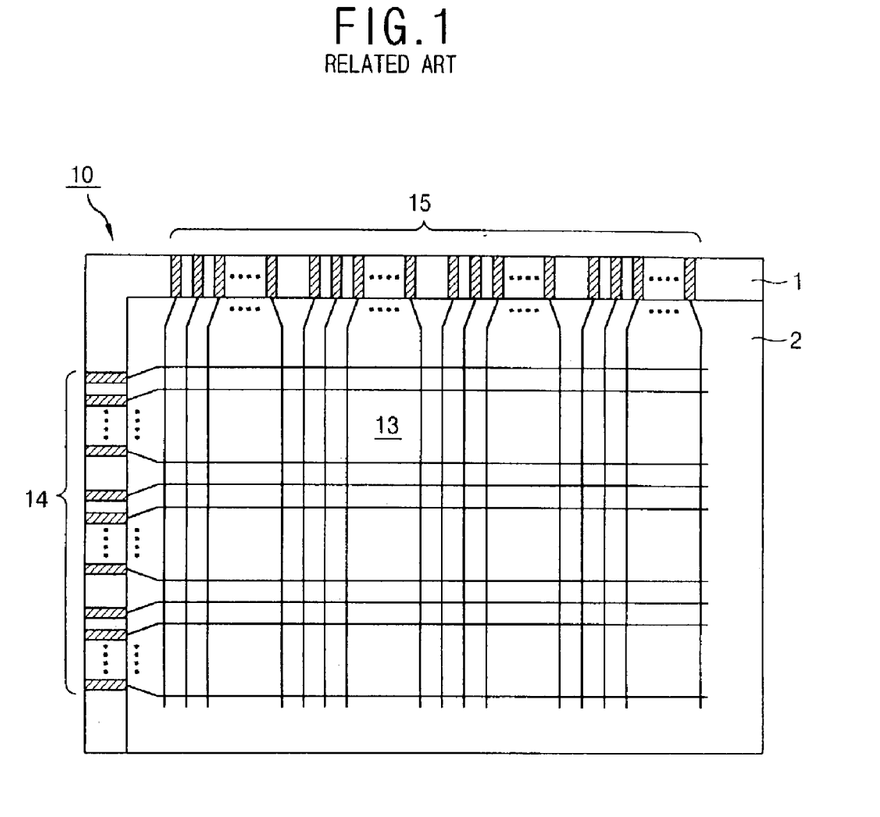
FIG. 1 illustrates a schematic layout of a related art unit liquid crystal display panel having a thin film transistor array substrate and a color filter substrate bonded to each other.

FIG. 1 illustrates a schematic layout of a related art unit liquid crystal display panel prepared by bonding a thin film transistor array substrate and a color filter substrate to each other.

Referring to FIG. 1, a liquid crystal display panel 10 includes an image display part 13 having liquid crystal cells arranged in a matrix form, a gate pad part 14 connected to gate lines of the image display part 13, and a data pad part 15 connected to data lines. In this case, the gate and data pad parts 14 and 15 are respectively formed on the edge areas of a thin film transistor array substrate 1 which does not overlap a color filter substrate 2. The gate pad part 14 provides the gate lines of the image display part 13 with each corresponding scan signals supplied from a gate driver integrated circuit, and the data pad part 15 provides the data lines with image information supplied from a data driver integrated circuit.

On the thin film transistor array substrate 1 of the image display unit 13, the data lines having the image information applied thereto and the gate lines having the scan signals applied thereto to cross vertically with each other. Thin film transistors at each intersection are formed to switch the liquid crystal cells. Pixel electrodes are connected to the thin film transistors to drive the liquid crystal cells. A passivation layer is formed on the entire surface to protect the electrodes and the thin film transistors.

Moreover, color filters separated by a black matrix for each cell area are formed on the color filter substrate 2. A transparent common electrode as a counter electrode of the pixel electrode is formed on the thin film transistor array substrate 1.

A cell gap is provided between the thin film array substrate 1 and the color filter substrate 2, which are bonded to each other by a sealing part (not shown) formed at the periphery of the image display unit 13, so as to be spaced apart from each other. And, a liquid crystal layer (not shown) is formed in the space between the thin film transistor array substrate 1 and the color filter substrate 2.

Figure 2:
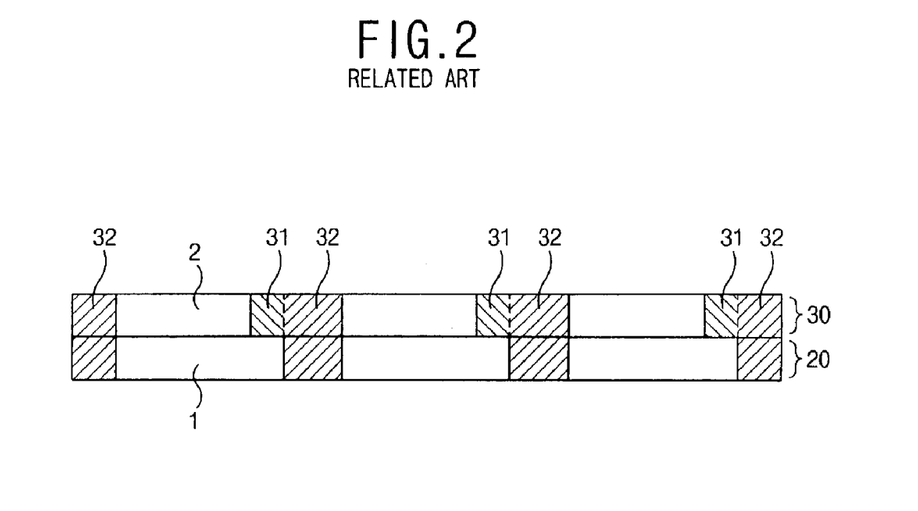
FIG. 2 illustrates a cross-sectional view of a first mother substrate having thin film transistor array substrates and a second mother substrate having color filter substrates according to a related art, in which the first and second mother substrates are bonded to each other to form a plurality of liquid crystal display panels.

FIG. 2 illustrates a cross-sectional view of a first mother substrate having thin film transistor array substrates 1 and a second mother substrate having color filter substrates 2, in which the first and second mother substrates are bonded to each other to form a plurality of liquid crystal display panels.

Referring to FIG. 2, each unit liquid crystal display panel has a thin film transistor array substrate longer than a corresponding color filter substrate 2. This is because the gate and data pad parts 14 and 15 are formed at the corresponding edges of the thin film transistor array substrate 1 which does not overlap the color filter substrate 2, as shown in FIG. 1.

Hence, the second mother substrate 30 and the color filter substrates 2 formed thereon are spaced apart from each other by a dummy area 31 corresponding to the protruding area of each thin film transistor array substrate 1 on the first mother substrate 20.

Moreover, the unit liquid crystal display panels are arranged properly to make best use of the first and second mother substrates 20 and 30. Although it depends on models, the unit liquid crystal display panel is generally spaced apart from each other at a distance corresponding to the area of the other dummy area 32.

After the first mother substrate 20 having the thin film transistor array substrates 1 is bonded to the second mother substrate 30 having the color filter substrates 2, the liquid crystal display panels are individually cut. In this case, the dummy area 31 of each color filter substrate 2 of the second mother substrate 30 and the other dummy area 32 separating the unit liquid crystal display panels from each other are removed at the same time.

Figure 3:
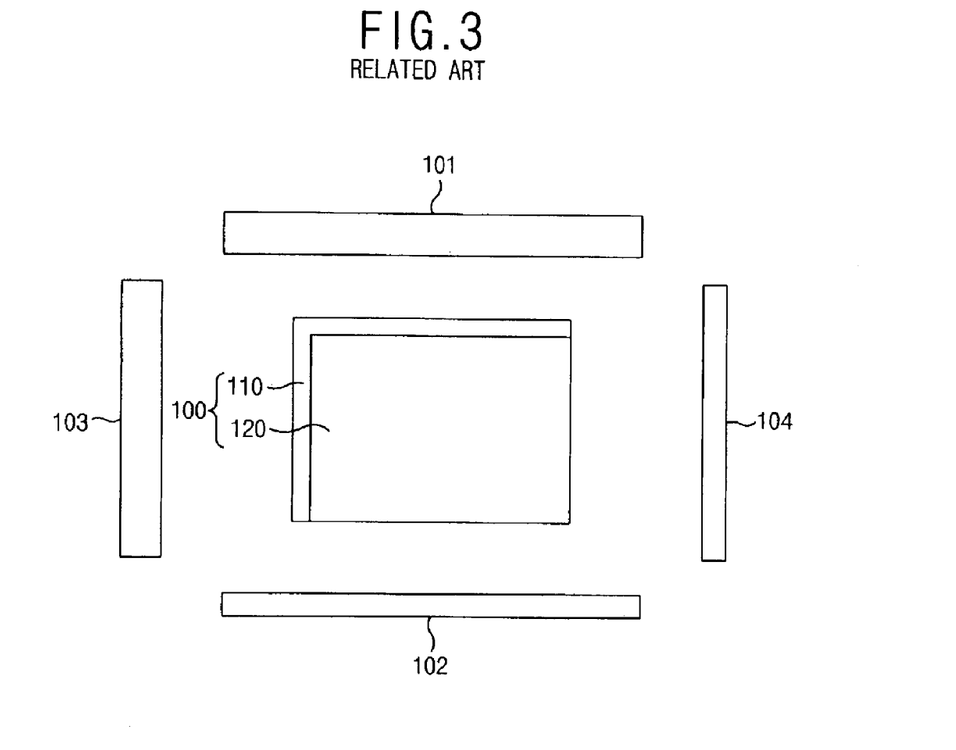
FIG. 3 illustrates a layout of a related art apparatus for testing a unit liquid crystal display panel.

FIG. 3 illustrates a layout of a related art apparatus for testing a unit liquid crystal display panel. As shown in FIG. 3, the related art apparatus for testing a unit liquid crystal display panel includes first and second test bars 101 and 102 for testing cutting states and corresponding to two longer sides (i.e., a side having a data pad part and its confronting side) of a unit liquid crystal display panel 100, and third and fourth test bars 103 and 104 for testing cutting states and corresponding to two shorter sides (i.e., a side having a gate pad part and its confronting side) of a unit liquid crystal display panel 100.

The first and second test bars 101 and 102 are to inspect whether a burr remains on the longer sides of the unit liquid crystal display panel 100 cut by a touching method. The third and fourth test bars 103 and 104 are to inspect whether a burr remains on the shorter sides of the unit liquid crystal display panel 100 cut by the same method for cutting the longer sides of the unit liquid crystal display panel 100.

Meanwhile, since the unit liquid crystal display panel 100 differs in size in accordance with a model, the first and second test bars 101 and 102 and the third and fourth test bars 103 and 104 are prepared to have the same lengths of the longer and shorter sides of the largest model of the unit liquid crystal display panel 100 for inspecting whether a burr remains on the longer and shorter sides of any kind of the unit liquid crystal display panel 100.

Moreover, in the unit liquid crystal display panel 100, a color filter substrate 120 is bonded to a thin film transistor array substrate 110 so that one side of the thin film transistor array substrate 110 protrudes from the corresponding color filter substrate 120. As described with reference to FIG. 1, the gate and data pad parts are formed at the corresponding edges of the thin film transistor array substrate 110 that does not overlap the color filter substrate 120.

Hence, a step difference is generated at each side of the longer and shorter sides of the unit liquid crystal display panel 100. In order to inspect the longer side of the unit liquid crystal display panel 100, the first test bar 101 corresponding to the longer side of the unit liquid crystal display panel 100 having a data pad part is formed to gear with the longer side of the unit liquid crystal display panel 100 having the step difference. Also, the third test bar 103 corresponding to the shorter side of the unit liquid crystal display panel 100 having a gate pad part is formed to gear with the shorter side of the unit liquid crystal display panel 100 having the step difference.

As described above, an inspection is made to determine whether a burr remains on the longer and shorter sides of the unit liquid crystal display panel 100 by a touching method using the first to fourth test bars 101 to 104. Thereafter, an operator then extracts the unit liquid crystal display panel 100 without a burr from the production line for a period of time to inspect whether a cutting size of the unit liquid crystal display panel 100 is proper or not through an additional measurement apparatus.

The related art apparatus and method for testing the liquid crystal display panel art determine whether a burr remains on the longer and shorter sides of the unit liquid crystal display panel by that the first to fourth test bars physically touch the longer and shorter sides of the unit liquid crystal display panel.

However, reliability of the test is low. Also, a burr cannot be detected if the longer and shorter sides of the unit liquid crystal display panel are torn in part to form a groove or a recess.

In the related art apparatus and method for testing the liquid crystal display panel, the unit liquid crystal display panel that passed the inspection is extracted from the production line for a period of time to carry out the size test of the cut unit liquid crystal display panel through an additional measurement apparatus. Hence, an operator transports the unit liquid crystal display panel from the production line to the measurement apparatus for the size test of the cut liquid crystal display panel and then carries out the size test in the measurement apparatus. Such a work is troublesome as well as inconvenient. Besides, since the time taken for the size test of the cut unit liquid crystal display panel is increased, and productivity becomes decreased.

Moreover, as an expensive measurement apparatus is necessary in addition, the equipment and maintenance costs of the production line are increased, thereby inevitably increasing a product cost.

Finally, since the size test is a sampling test for a period of time, reliability of the test is low. If a remaining burr is spotted on the liquid crystal display panel, the whole operation is stopped and then all the unit liquid crystal display panels after the previously sampled unit liquid crystal display panel should be inspected. In such a case, the unit liquid crystal panels on which the subsequent processes are already carried out may be a waste of raw materials and time.

SUMMARY OF THE INVENTION

Accordingly, the present invention is directed to an apparatus and a method for testing a liquid crystal display panel that substantially obviate one or more of problems due to limitations and disadvantages of the related art.

Another object of the present invention is to provide an apparatus and a method for testing a liquid crystal display panel enabling to conveniently inspect a cutting plane of an individual unit liquid crystal display panel prepared by cutting liquid crystal display panels fabricated on a pair of mother substrates.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for testing a liquid crystal display panel according to the present invention includes a first memory unit storing a reference image of an end portion of a reference panel taken through a camera, a second memory unit storing an observed image of an end portion of a cut unit liquid crystal display panel taken through the camera, a comparison/computation unit computing a difference value by comparing the reference image and the observed image, and a display unit displaying the difference value of the comparison/computation unit.

In another aspect of the present invention, a method of testing a liquid crystal display includes photographing a reference image at an end portion of a reference panel, photographing an observed image at an end portion of a testing liquid crystal display panel, computing a difference value by comparing the reference image and the observed image, and displaying the difference value.

In a further aspect of the present invention, a method of testing a liquid crystal display includes bonding first and second substrates to each other, cutting the bonded first and second substrates into a plurality of unit liquid crystal display panels, photographing an observed image of an end portion of each of the unit liquid crystal display panels through a camera, computing a difference value by comparing the observed image to a reference image of an end portion of a reference panel, and displaying the difference value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
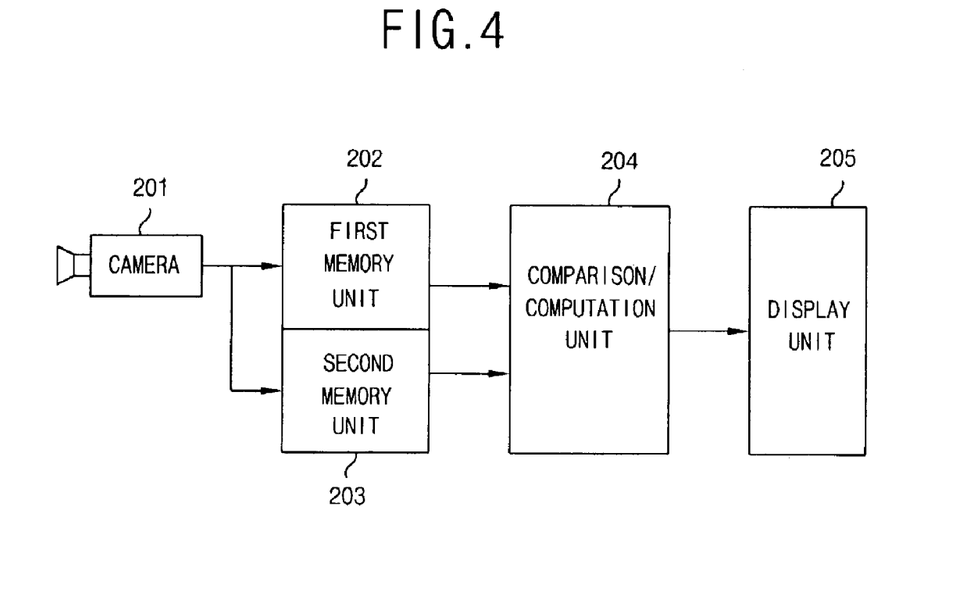
FIG. 4 illustrates a block diagram of an apparatus for testing a liquid crystal display panel according to the present invention.

FIG. 4 illustrates a block diagram of an apparatus for testing a liquid crystal display panel according to the present invention. As shown in FIG. 4, the apparatus for testing a liquid crystal display panel according to the present invention includes a first memory unit 202 storing a reference image of the end portion of a reference panel taken through a camera 201, a second memory unit 203 storing an observed image of the end portion of a cut unit liquid crystal display panel taken through the camera 201, a comparison/computation unit 204 computing a difference value by comparing the reference image and the observed image of the first and second memory units 202 and 203 to each other, and a display unit 205 displaying the difference value of the comparison/computation unit 204 to an operator. In this case, a charge coupled device (CCD) camera may be applicable to the camera 201.

The unit liquid crystal display panel may be fabricated by bonding a first substrate having a thin film transistor array to a second substrate having a color filter array and forming a liquid crystal layer by liquid crystal injection. Instead, the unit liquid crystal display panel may be fabricated by dropping liquid crystals on one of the first and second substrates and bonding the first and second substrates to each other in a vacuum condition.

A sealant may be formed on the substrate having the liquid crystals dropped thereon to bond the first and second substrates to each other. Instead, the sealant can be formed on the other substrate without the liquid crystals dropped thereon.

Figure 5A:
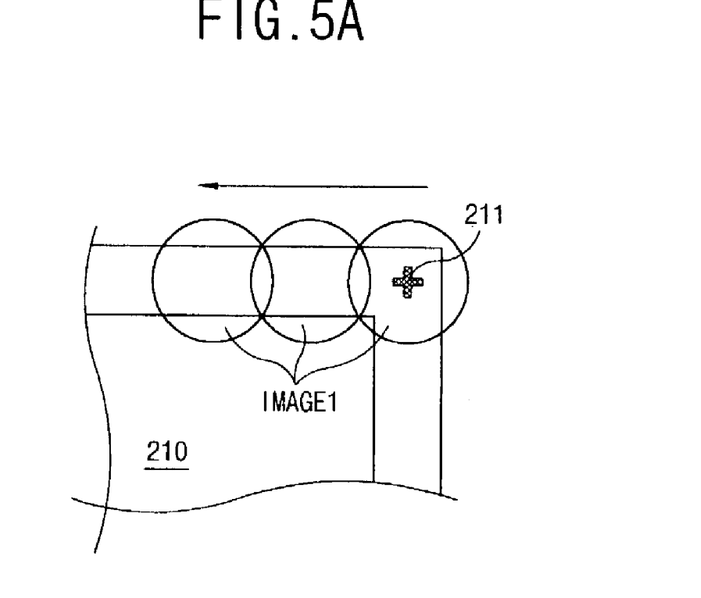
FIG. 5A illustrates a diagram of a reference image taken through the apparatus in FIG. 4.
Figure 5B:
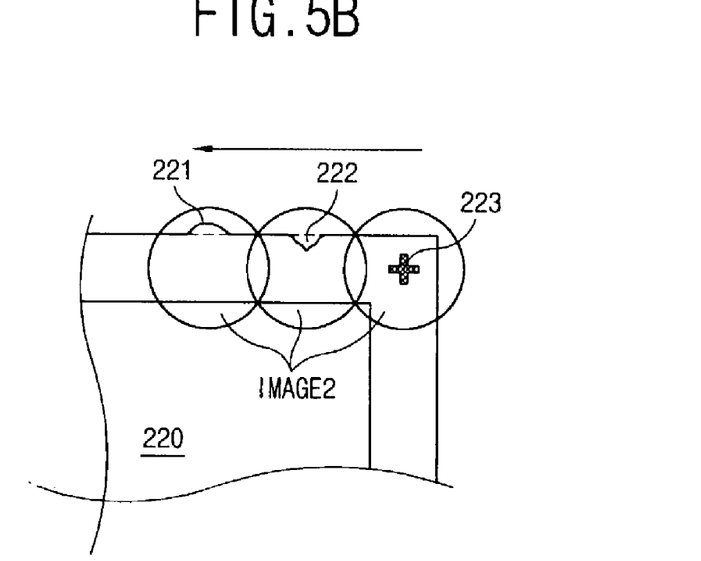
FIG. 5B illustrates a diagram of an observed image taken through the apparatus in FIG. 4.

FIGs. 5A and 5B respectively illustrate a diagram of a reference image taken by the camera in FIG. 4 and a diagram of an observed image taken by the camera in FIG. 4.

Referring to FIG. 5A, a reference image IMAGE1 of the end portion of a reference panel 210 photographed through the camera 201 is schematically illustrated. In this case, the reference panel 210 is previously fabricated to have an ideal size for a cut unit liquid crystal display panel having an aligning mark 211 at a corner of the reference panel 210 to align the camera 201 and the reference panel 210 with each other.

Sequentially, the camera 201 is aligned with the reference panel 210 through the aligning mark 211, scans the reference panel 210 along an edge of the reference panel 210 to photograph the end portion of the reference panel 210 to extract the reference image IMAGE1, and stores information of the reference image IMAGE1 in the first memory unit 202.

Referring to FIG. 5B, an observed image IMAGE2 of the end portion of a cut unit liquid crystal display panel 220 photographed through the camera 201 is schematically illustrated. In this case, since a plurality of liquid crystal display panels fabricated on a wide mother substrate are individually cut, a burr 221 may remain on a cutting plane of the unit liquid crystal display panel 220 or the cutting plane may be torn to form a recess 222 or a groove.

Since the burr 221 or recess 222 causes degradation in driving the liquid crystal display panel, the burr 221 or the recess 222 should be inspected to extract the unit liquid crystal display panel having a burr or a recess.

An aligning mark 223 for aligning the camera 201 with the unit liquid crystal display panel is formed at the same location as the reference panel 210.

Hence, the camera 201 is aligned with the unit liquid crystal display panel 220 through the aligning mark 223, scans the unit liquid crystal display panel 220 along the edge of the unit liquid crystal display panel 220 to photograph the end portion of the unit liquid crystal display panel 220 to take the observed image IMAGE2, and stores information of the observed image IMAGE2 in the second memory unit 203.

As mentioned in the foregoing description, the information of the reference image IMAGE1 stored in the first memory unit 202 and the information of the observed image IMAGE2 stored in the second memory unit 203 are computed by the comparison/computation unit 204 to generate a difference value. And, the difference value is displayed to an operator through the display unit 205.

The difference value between the reference and observed images IMAGE1 and IMAGE2 is computed by the pixel unit of the camera 201. Namely, once a magnifying power of the camera 201 is determined, a size of a single pixel is determined in accordance with the resolution. Hence, information on how many pixels differ between the observed image IMAGE2 picturing the burr 221 or the recess 222 and the reference image IMAGE1 picturing the end portion of the reference panel 210 is extracted, and then the number of the pixels is multiplied by the size to compute the difference value.

In this case, when the burr 221 appears on the observed image IMAGE2, the corresponding difference value is expressed by a positive number (+). On the contrary, when the recess 222 appears on the observed image IMAGE2, the corresponding difference value is expressed by a negative number (−). Thus, the operator can easily recognize the difference value.

Hence, the operator conveniently recognizes whether the burr or recess is formed at the cutting plane of the cut unit liquid crystal display panel through the difference value represented by the display unit 205 as well as enables to determine whether the value is within an allowable range.

Meanwhile, when the camera extracts the observed image IMAGE2 by being aligned with the unit liquid crystal display panel 220 through the aligning mark 223 and scanning the edge of the unit liquid crystal display panel 220 to photograph the end of the cut unit liquid crystal display panel 220, lengths of the longer and shorter sides of the unit liquid crystal display panel are measured through a moving distance of the camera 201 and stored in the second memory unit 203. The lengths are displayed to the operator through the display unit 205. Hence, it is able to test whether the burr 221 or the recess 222 is formed at the cutting plane of the unit liquid crystal display panel 220. In addition, a size of the unit liquid crystal display unit 220 can be tested simultaneously.

As described above, the apparatus and the method for testing the liquid crystal display panel according to the present invention are to inspect the cutting plane of the unit liquid crystal display panel by comparing the reference image of the end portion of the reference panel photographed through the camera to the observed image of the end portion-of the cut unit liquid crystal display panel photographed through the camera and providing the operator with the difference value.

Accordingly, compared to the physically touching method using the test bars according to the related art, the present invention applies an optical system using a camera to improve reliability of the test. Besides, the present invention enables to inspect a degradation caused by the burr and the recess formed at the cutting plane of the unit liquid crystal display panel, which cannot be detected by the related art method and apparatus. Therefore, the present invention enables to minimize the degradation of the product.

And, the apparatus and method for testing the liquid crystal display panel according to the present invention measure the lengths of the longer and shorter sides of the unit liquid crystal display panel through the moving distance of the camera to carry out the size test of the unit liquid crystal display panel.

Therefore, the present invention enables to improve the troublesomeness and inconvenience of extracting the unit liquid crystal display panel from the production line for the size test to transfer to an additional measuring apparatus according to the related art, and also enables to reduce the time taken for the size test of the unit liquid crystal display panel to improve productivity. Besides, the present invention requires no additional measuring apparatus, thereby reducing costs of the production line and its maintenance.

Moreover, unlike the related art using the sampling system for carrying out the size test by extracting the unit liquid crystal display panel periodically, the present invention carries out the size test for the entire unit liquid crystal display panels, thereby improving reliability of the test.

Furthermore, the related art method should stop the operation if the unit liquid crystal display panel is determined to have a remaining burr spotted thereon, and then test all the unit liquid crystal display panels from the next one of the previously sampled unit liquid crystal display panel to the one prior to the sampled unit liquid crystal display panel for the inspection. Hence, the related art method may abandon the unit liquid crystal display panels having undergone the subsequent processes, so that it is a waste of the raw materials and the process time.

However, the present invention enables to carry out the size test for the entire unit liquid crystal display panels, thereby preventing such problems of the related art.

It will be apparent to those skilled in the art that various modifications and variations can be made in the apparatus and the method for testing a liquid crystal display panel of the present invention without departing from the spirit or scope of the inventions. Thus, it is intended that the present invention covers the modifications and variations of this invention provided they come within the scope of the appended claims and their equivalents.

What is claimed is:

1. An apparatus for testing a liquid crystal display panel, comprising:
    a first memory unit storing a reference image of an end portion of a reference panel taken through a camera;
    a second memory unit storing an observed image of an end portion of a cut unit liquid crystal display panel taken through the camera;
    a comparison/computation unit computing a difference value by comparing the reference image and the observed image; and
    a display unit displaying the difference value of the comparison/computation unit.

2. The apparatus of claim 1, wherein the camera is a charge coupled device (CCD) camera.

3. The apparatus of claim 1, wherein each of the reference panel and the cut unit liquid crystal display panel has an aligning mark at a corner.

4. The apparatus of claim 1, wherein the second memory unit additionally stores a moving distance of the camera to display through the display unit.

5. The apparatus of claim 1, wherein the difference value is a positive (+) number when a burr appears on the observed image.

6. The apparatus of claim 1, wherein the difference value is a negative (−) number when a recess appears on the observed image.

7. A method of testing a liquid crystal display panel, comprising:
    photographing a reference image at an end portion of a reference panel;
    photographing an observed image at an end portion of a testing liquid crystal display panel;
    computing a difference value by comparing the reference image and the observed image; and
    displaying the difference value.

8. The method of claim 7, wherein the photographing the reference image includes:
    aligning the reference panel with a camera through an aligning mark at a corner of the reference panel; and
    obtaining the reference image by scanning the camera along an edge of the reference panel to photograph the end portion of the reference panel.

9. The method of claim 7, wherein the photographing the observed image includes:
    aligning the testing liquid crystal display panel with the camera through an aligning mark at a corner of the testing liquid crystal display panel; and
    obtaining the observed image by scanning the camera along an edge of the testing liquid crystal display panel to photograph the end portion of the unit liquid crystal display panel.

10. The method of claim 7, wherein the difference value is expressed by a positive (+) number when a burr appears on the observed image and a negative (−) number when a recess appears on the observed image.

11. The method of claim 7, wherein the photographing the observed image along the end portion of the liquid crystal display panel is carried out by displaying measured lengths of longer and shorter sides of the testing liquid crystal display panel through a moving distance of the camera.

12. A method of testing a liquid crystal display panel, comprising:
    bonding first and second substrates to each other;
    cutting the bonded first and second substrates into a plurality of unit liquid crystal display panels;
    photographing an observed image of an end portion of each of the unit liquid crystal display panels through a camera;

computing a difference value by comparing the observed image to a reference image of an end portion of a reference panel; and displaying the difference value.

13. The method of claim 12, further comprising forming a liquid crystal layer after bonding the first and second substrates to each other.

14. The method of claim 12, further comprising forming a liquid crystal layer by dropping liquid crystals on one of the first and second substrates before bonding the first and second substrates to each other.

15. The method of claim 12, wherein the difference value between the observed image and the reference image indicates information on a cutting plane of each of the unit liquid crystal display panels.

16. The method of claim 15, wherein the difference value is a positive (+) number when the cutting plane has a burr.

17. The method of claim 15, wherein the difference value is a negative (−) number when the cutting plane has a recess.

* * * * *